United States Patent [19]

Buysch et al.

[11] 4,263,162
[45] Apr. 21, 1981

[54] CYANOETHYLATED POLYAMIDE AMINES AS HARDENERS FOR POLYEPOXIDES

[75] Inventors: Hans-Josef Buysch, Krefeld; Hermann Gruber, Leverkusen; Wolfgang Wellner, Cologne; Karl Leiritz, Monheim, all of Fed. Rep. of Germany

[73] Assignee: Bayer Aktiengesellschaft, Fed. Rep. of Germany

[21] Appl. No.: 101,752

[22] Filed: Dec. 10, 1979

[30] Foreign Application Priority Data

Dec. 16, 1978 [DE] Fed. Rep. of Germany ....... 2854436

[51] Int. Cl.$^3$ ............................................. C08G 59/54
[52] U.S. Cl. ................................. 252/182; 528/116; 528/118; 528/120; 528/324; 528/111; 528/117; 260/465.2; 260/465.4; 544/386
[58] Field of Search .............. 528/116, 117, 118, 324, 528/120; 252/182; 260/465.2, 465.4; 544/386

[56] References Cited

U.S. PATENT DOCUMENTS

| | | |
|---|---|---|
| 2,753,323 | 7/1956 | Farnham ................................. 260/47 |
| 2,847,342 | 8/1958 | Kohn ..................................... 154/140 |
| 3,036,975 | 5/1962 | Taub ........................................ 260/2 |
| 3,091,595 | 5/1963 | Mika ....................................... 260/18 |
| 3,622,540 | 11/1971 | Hashimoto et al. .................... 260/47 |

*Primary Examiner*—Earl A. Nielsen
*Attorney, Agent, or Firm*—Connolly and Hutz

[57] ABSTRACT

Hardeners for polyepoxides containing more than one, 1,2-epoxide group per molecule comprising a cyanoethylated polyamide amine containing free secondary or primary or secondary and primary amino groups, said cyanoethylated poly-amide amine is a reaction product of polyadded units of (A) 1 mole of a polyamine corresponding to the formula:

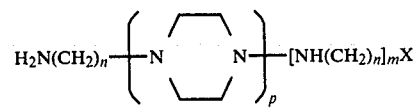

in which p=0, n=2 or 3, m=0 to 6 and X=NH$_2$, or p=1, n=2 or 3, m=0 and X=H, (B) from 0.5 to 2.3 moles of a saturated lactam, and
(C) from 0.4 to 2.8 moles of acrylonitrile, methacrylonitrile or mixtures thereof.

The hardener may be additionally modified with from 0.01 to 1.8 moles of a 1,2-alkylene oxide containing from 2 to 4 carbon atoms or with from 0.001 to 0.3 moles of a carboxylic acid or with the 1,2-alkylene oxide and the carboxylic acid in the quantities indicated, based in each case on 1 mole of the polyamine. The hardeners harden with 1,2-polyepoxides even in thin layers, over a period of 24 hours at room temperature to form clear, smooth films having a non-tacky fault-free surface.

3 Claims, No Drawings

CYANOETHYLATED POLYAMIDE AMINES AS HARDENERS FOR POLYEPOXIDES

This invention relates to new hardening agents for 1,2-polyepoxides containing more than one 1,2-epoxide group per molecule, the hardening agents comprising reaction products of lactams with polyamines and acrylonitrile.

It is known that aliphatic primary and/or secondary diamines or polyamines can be reacted with ε-caprolactam to form polyamides containing amino groups, preferably polyamides containing at least two amide groups and two primary amino groups, and that the reaction products thus obtained can be used as hardeners for polyepoxide resins (cf. German Auslegeschrift No. 1,124,688 = U.S. Pat. No. 3,036,975). As can be seen from these Patent Specifications, the (ε-caprolactam) polyamide amines are liquid or solid compounds. The liquid products, mixed with standard liquid polyepoxide resins, for example based on bisphenol A (epoxide equivalent 175–210), may be used as cast resins and, in a 40 g batch, hardened in 40 minutes in the absence of heat. However, to obtain high thermal stability and resistance to chemicals, mouldings of mixtures such as these have to be subsequently tempered for several hours at temperatures in the range of from 120° to 150° C. A major disadvantage of mixtures such as these is the fact that, despite their high reactivity, they cannot be used as coating compositions hardening at room temperature because films hardened at room temperature remain dull and tacky. According to Example II of the above-mentioned Patent Specification, mixtures produced from liquid amide amines and solid (relatively high molecular weight)bis-phenol-A epoxide resin, dissolved in a solvent, can also only be used as coating compositions stovable at temperatures of around 120° C. The same applies to the solid polyamide amines of ε-caprolactam. It can also be seen from the above-mentioned Patent Specifications that hardened products of epoxide resins and polyamide amines based on ε-caprolactam and polyamines show better thermal stability under load and higher resistance to chemicals than corresponding products containing polyamide amines based on dimerised fatty acids and polyamines.

It is also known that primary and/or secondary diamines and/or polyamines, for example ethylene diamine, tetramethylene pentamine, etc, can be reacted with acrylonitrile to form cyanoethylated diamines and polyamines (cf. German Auslegeschrift No. 1,034,856 = U.S. Pat. No. 2,753,323) and that the reaction products thus obtained may be used as hardeners for polyepoxides containing more than one 1,2-epoxide group per molecule. A major advantage of the cyanoethylated amines lies in the fact that, compared with the starting amines, they show reduced reactivity to epoxide compounds and, hence, have a longer pot life, i.e. the time interval between the moment when the hardening agent is added to the polyepoxide and the moment when the polyepoxide/hardener mixture ceases to be processible is increased. The reduction in reactivity is greater, the larger the number of original amine hydrogen atoms which have been cyanoethylated. For producing large-volume mouldings of polyepoxides, it is possible with advantage to use cyanoethylated polyamines, although in this case hardening has to be carried out at elevated temperatures in order to obtain good mechanical and electrical properties. However, a serious disadvantage lies in the fact that, where polyepoxides are hardened at room temperature, particularly in thin layers, cyanoethylated polyamines are not sufficiently hardened on account of atmospheric influences so that, even after hardening for several days, unattractive and tacky surfaces are obtained. The same applies to the unmodified starting amines which, hardened with polyepoxides in thin layers at room temperature, show smeary and blue-streaked surfaces, even after prolonged hardening, despite their often high reactivity.

Finally, it is known from U.S. Pat. No. 3,091,595 that polyamide amines can be produced from dimerised fatty acids and polyamines and that all or some of the amino hydrogen atoms still present can be converted with acrylonitrile into cyanoethylated polyamide amines. Neither the polyamide amines of dimerised fatty acids and polyamines nor the acrylonitrile-modified polyamide amines of dimerised fatty acids and polyamines harden with polyepoxides in thin layers over a period of 24 hours at room temperature to form clear, hard non-tacky films having a fault-free surface, as can be seen from Example 1 of U.S. Pat. No. 3,091,595 and the Comparison Tests in the present Application.

Accordingly, an object of the present invention is to provide hardening agents for 1,2-polyepoxides which not only have a long pot life and are suitable for the production of compact mouldings, optionally by hardening under heat, but also harden in thin layers over a period of 24 hours at room temperature to form clear, glossy non-tacky films with a fault-free surface, i.e. without any blooming or so-called fish-eye effects. The hardening agents are intended as far as possible to be liquid so that there is little, if any, need to add the usual solvents. Favourable mechanical properties of the hardened products are, of course, also intended to be obtained.

According to the invention, this object is achieved by reacting selected polyamines with lactams and acrylonitrile to form cyanoethylated polyamide amines.

It must be regarded as unexpected that the hardening agents according to the invention harden with 1,2-polyepoxides, even in thin layers, over a period of 24 hours at room temperature to form clear, smooth films having a non-tacky fault-free surface because this result is not achieved either with structurally the closest, considerably more reactive reaction products of caprolactam and polyamines (unmodified with acrylonitrile) or with the highly reactive reaction products of dimerised fatty acids and polyamines or their modification products with acrylonitrile.

Accordingly, the present invention provides hardening agents for polyepoxides containing more than one 1,2-epoxide group per molecule based on cyanoethylated polyamide amines containing free secondary or primary or secondary and primary amino groups, characterised in that the cyanoethylated polyamide amine is a reaction product of polyadded units of (A) 1 mole of a polyamine corresponding to the following formula:

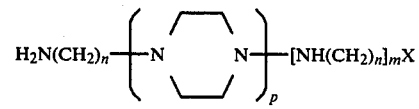

in which $p=0$, $n=2$ or 3, $m=0$ to 6, and $X=NH_2$, or $p=1$, $n=2$ or 3, $m=0$ and $X=H$, (B) from 0.5 to 2.3 moles, preferably from 0.8 to 1.9 moles, of a saturated lactam, and (C) from 0.4 to 2.8 moles, preferably from 0.6 to 2.5 moles, of acrylonitrile, methacrylonitrile or mixtures thereof.

If desired, the cyanoethylated polyamide amines according to the invention may have been modified with from 0.01 to 1.8 moles, preferably with from 0.1 to 1.6 moles, based on 1 mole of the polyamine, of a 1,2-alkylene oxide containing from 2 to 4 carbon atoms and/or with from 0.001 to 0.3 mole, preferably with from 0.01 to 0.25 mole, of a carboxylic acid either before or after the reaction of the polyamide amine (of lactam and polyamine) with acrylonitrile.

Examples of suitable polyamines are ethylene diamine, propylene diamine, diethylene triamine, dipropylene triamine, triethylene tetramine, tetraethylene pentamine, pentaethylene hexamine, N-aminopropyl ethylene diamine, N-aminoethyl piperazine and N-aminopropyl piperazine. It is preferred to use polyamines corresponding to the above formula in which $p=0$, $n=2$ or 3, $m=0$ to 6 and $X=NH_2$ and particularly those polyamines in which $p=0$, $n=2$, $m=1$ to 4 and $X=NH_2$. Mixtures of polyamines may also be used.

Suitable saturated lactams are those corresponding to the following formula:

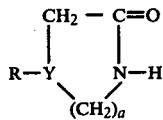

in which
Y represents a CH group, in which case
R represents hydrogen and
a is an integer of from 0 to 9, or
Y represents a nitrogen atom, in which case
R represents a saturated aliphatic radical, preferably methyl, an araliphatic radical containing from 7 to 12 carbon atoms or a pyridine radical or a pyridine radical substituted by lower alkyl radicals ($C_1$-$C_4$), and
a is the number 3, or mixtures thereof.

Preferred lactams are γ-butyrolactam, δ-valerolactam, ε-caprolactam and lauric lactam, particularly, ε-caprolactam. Instead of using the lactams, it is also possible to use the amino carboxylic acids on which the lactams are based for producing the amide amines.

Instead of using acrylonitrile, it is also possible to use methacrylonitrile or mixtures of acrylonitrile and methacrylonitrile. It is preferred to use acrylonitrile.

The 1,2-alkylene oxides used are generally ethylene oxide, propylene oxide and 1,2-butylene oxide, preferably propylene oxide.

Suitable carboxylic acids are $C_1$-$C_{18}$ carboxylic acids which may also contain heteroatoms. Examples of carboxylic acids such as these are formic acid, acetic acid, propionic acid, pivalic acid, isooctanoic acid, oleic acid, stearic acid, benzoic acid, hexahydrobenzoic acid, adipic acid, sebacic acid, tetrahydrophthalic acid, hexahydrophthalic acid, glycolic acid, diglycolic acid, thioglycolic acid and mercaptopropionic acid. It is preferred to use aliphatic, saturated carboxylic acids containing from 1 to 8 carbon atoms, thioglycolic acid, mercaptopropionic acid, adipic acid, tetrahydrophthalic and hexahydrophthalic acid, particularly aliphatic saturated monocarboxylic acids containing from 1 to 8 carbon atoms.

The cyanoethylated polyamide amines are generally produced under process conditions known per se for example as follows. The lactams or aminocarboxylic acids are reacted with the polyalkene polyamines at temperatures in the range of from 120° to 300° C., preferably at temperatures in the range of from 150° to 280° C. and, with particular preference, at temperatures in the range of from 150° to 250° C. The addition or condensation reaction may be carried out purely thermally or in the presence of acid catalysts. The catalysts used may be strong inorganic or organic acids, such as phosphoric acid, phosphorous acid, sulphuric acid, hydrochloric acid, phenyl phosphonic acid, and benzene or toluene sulphonic acid. The catalysts are used in a quantity of from 0.01 to 1% by weight, based on lactam or aminocarboxylic acid. The reaction time varies between about 30 minutes and several hours and is selected in such a way that the reaction is substantially complete. Unreacted starting materials may be separated off by distillation. However, this is not generally necessary. One advantage of the products according to the invention lies inter alia in the fact that unreacted fractions of, in all, up to 40% by weight, based on the starting materials, may remain in the reaction mixture without any significant change in the properties. The molar ratio between the reactants used normally corresponds to the molar ratio required in the polyamide amine, i.e. from 0.5 to 2.3 moles of lactam or amino acid per mole of polyamine. However, it may also be higher or lower, although in that case the starting material present in excess must be at least partly removed before the further reaction.

The addition of acrylonitrile or methacrylonitrile or mixtures thereof is carried out at 10° to 180° C., preferably at 20° to 140° C. and, more particularly, at 30° to 120° C. The nitriles are used in the quantity which the required end product is intended to contain, i.e. from 0.4 to 2.8 moles per mole of polyamine. Since the addition reaction is generally exothermic (meth)acrylonitrile is preferably added to the reaction products of the lactams or amino acids with the polyamines in a quantity commensurate with the amount of heat to be dissipitated.

The reaction of the polyamide amines with the 1,2-alkylene oxides is carried out similarly to the reaction with acrylonitrile and may precede or follow the acrylonitrile addition reaction.

Modification with the carboxylic acids may be carried out at temperatures in the range of from 100° to 300° C. and may take place during or after the reaction of the lactam with the polyamine or after addition of the (meth)acrylonitrile or 1,2-alkylene oxide.

The hardening agents according to the invention are liquids which may be mixed with up to 20% by weight of a suitable diluent, such as benzyl alcohol, for further reducing their viscosity. The hardening agents have amine equivalents (=NH equivalent) of from 60 to 120, the amine equivalent being the quotient of the molecular weight of the product and the number of hydrogen atoms attached to amine nitrogen. Hydrogen atoms attached to carbonyl amino groups (—CO—NH—) are excluded.

The hardening agents according to the invention may not only be used in the same way as standard aliphatic polyamines or polyamide amines for hardening polyepoxides under heat or in considerable layer thicknesses at room temperature. They may also be used for hardening polyepoxides in thin layers (less than 0.5 cm) at room temperature to obtain non-tacky, dust-dry, clear, glossy films and coatings with a satisfactory surface over a period of 24 hours. This latter use is a surprising advantage over comparable amine-based hardeners.

From 0.6 to 1.5 and preferably from 0.8 to 1.2 amine equivalents (=NH-equivalents) per epoxide equivalent of the hardening agents according to the invention may be used for hardening.

An epoxide equivalent is understood to be the quantity of 1,2-epoxide compound which contains one 1,2-epoxide group. Accordingly, the epoxide value is the number of 1,2-epoxide groups contained in 100 g of epoxide compound.

Suitable epoxides are the known, standard polyepoxides containing more than one 1,2-epoxide group. Polyepoxides such as these are inter alia polyglycidyl ethers of polyhydric phenols, for example of pyrocatechol, resorcinol, hydroquinone, of 4,4'-dihydroxydiphenylmethane, of 4,4'-dihydroxy-3,3'-dimethyldiphenylmethane, of 4,4'-dihydroxydiphenylmethylmethane (bisphenol A), of 4,4'-dihydroxydiphenylmethylmethane, of 4,4'-dihydroxydiphenylcyclohexane, of 4,4'-dihydroxy-3,3'-dimethyldiphenylpropane, of 4,4'-dihydroxydiphenyl, of 4,4'-dihydroxydiphenylsulphone, of tris-(4-hydroxyphenyl)-methane, of the chlorination and bromination products of the above-mentioned diphenols, particularly of bisphenol A; of novolaks (i.e. of reaction products of monohydric or polyhydric phenols with aldehydes, particularly formaldehyde, in the presence of acid catalysts), of diphenols obtained by esterifying 2 moles of the sodium salt of an aromatic hydroxy carboxylic acid with 1 mole of a dihalogen alkane or dihalogen dialkyl ether (cf. British Pat. No. 1,017,612) and of polyphenols obtained by condensing phenols and long-chain halogen paraffins containing at least 2 halogen atoms (cf. British Pat. No. 1,024,288).

In addition to the epoxy resins based on a polyhydric phenol and a chloroepoxy compound, it is also possible to use the epoxidised cyclic compounds according to U.S. Pat. No. 2,716,123.

It is also possible to use glycidyl ethers of polyhydric alcohols, for example of 1,4-butane diol, 1,4-butene diol, glycerol, trimethylol propane, pentaerythritol and polyethylene glycols.

Triglycidyl isocyanurate, N,N'-diepoxy propyl oxamide, polyglycidyl thioethers of polyhydric thiols, for example of bis-mercaptomethyl benzene, diglycidyl trimethylene trisulphone, epoxidised polybutadiene, epoxidised linseed oil, and vinyl cyclohexene diepoxide are also of interest. It is also possible to use glycidyl esters of polybasic aromatic, aliphatic and cycloaliphatic carboxylic acids, for example phthalic acid diglycidyl ester, terephthalic acid diglycidyl ester, tetrahydrophthalic acid diglycidyl ester, adipic acid diglycidyl ester, hexahydrophthalic acid diglycidyl ester which may optionally be substituted by methyl groups, and glycidyl esters of reaction products of 1 mole of an aromatic or cycloaliphatic dicarboxylic acid anhydride and ½ mole of a diol or 1/n mole of a polyol containing n-hydroxyl groups, for example glycidyl carboxylic acid esters corresponding to the general formula:

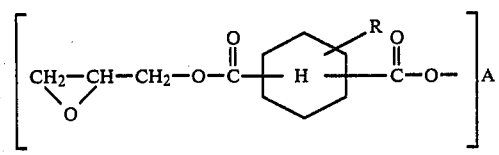

in which A represents an at least difunctional radical of an aliphatic hydrocarbon optionally interrupted by oxygen and/or cycloaliphatic rings or the difunctional radical of a cycloaliphatic hydrocarbon, R represents hydrogen or alkyl radicals containing from 1 to 3 carbon atoms and n is a number of from 2 to 6, or mixtures of glycidyl carboxylic acid esters corresponding to the above general formula (cf. British Pat. No. 1,220,702).

Epoxide resins which have been reacted with monocarboxylic acids, particularly with fatty acids such as those of linseed oil, soya oil, saffron oil, perilla oil, tung oil, poppy seed oil, sunflower oil, tall oil, walnut oil, dehydrated castor oil, herring oil and the like, are also of interest. The epoxide resins may readily be esterified by heating under reflux in the presence of one or more carboxylic acids and simultaneously removing the water by azeotropic distillation.

It is preferred to use polyglycidyl ethers of polyhydric phenols and polyhydric alcohols, and also glycidyl ethers, particularly polyepoxides based on bisphenol A.

The resin compositions of hardener and epoxide components may additionally contain extenders, such as coumarone oil, diluents, such as dibutyl phthalate, although they are preferably used without them, and also reactive diluents, such as monoglycidyl esters or monoglycidol ethers such as reaction products of phenols with epichlorhydrin, catalysts which accelerate hardening, such as alcohols, phenols, tertiary amines or organic acids, such as salicylic acid, and amines, acids, such as BF$_3$ or its adducts with alcohols, phosphorus compounds, such as triphenyl phosphite, retarders which retard hardening, such as ketones or esters, and finally solid additives, fillers and reinforcing materials, such as talcum, quartz powder, titanium dioxide, kieselguhr, heavy spar, asbestos, glass fibres, zinc dust, mica, siccatives, thixotropic agents and coloured pigments, such as iron oxide, chromium oxide and cadmium sulphide. For external applications, UV-stabilisers may also be added.

The described systems are used advantageously for applications where cold-hardening epoxide resins are generally used, for example for the production of castings and resin mats, but particularly in the coating and lacquering fields.

The substrates to be coated may consist of metals, wood, paper, cardboard, textiles, leather, glass, plastics, ceramic materials etc..

The parts and percentages quoted in the Examples are based on weight unless otherwise stated.

The reactivity quoted in the Tables is determined by leaving 100 g of the indicated resin/hardener mixture, the polyepoxide and amine hardener being used in equivalent quantities (1 epoxide equivalent=1 NH equivalent), standing at room temperature (approximately 23° C.) in a 250 ml beaker and observing the increase in temperature. The temperature reached after 20 minutes is indicated in the Table and is a measure of the reactivity of the resin/hardener mixture and also of the hardener. If the temperature exceeds 50° C. within 20 minutes, the pot life is too short. A mixture such as this also cannot be hardened to form compact, satisfactory mouldings in considerable layer thicknesses (>several cm), because the exothermic reaction can give rise to overheating of the reaction mixture which in turn can result in carbonisation of the casting.

The flow-out viscosities quoted in the Examples were measured in accordance with DIN 53 211 in a 6 mm flow-out cup.

The epoxide resin I quoted in the Tables is a bisphenol-A diglycidyl ether having an epoxide value of 0.55. Epoxide resin II is a mixture of epoxide resin I (70 parts by weight) and 30 parts by weight of tert.-butyl phenyl glycidyl ether, the tert.-butyl phenol used for producing the tert.-butyl phenyl glycidyl ether being a technical mixture of ortho- and para-tert.-butyl phenol. The tert.-butyl phenol is reacted in known manner with epichlorohydrin in the presence of sodium hydroxide to form glycidyl ether. Epoxide resin II has an epoxide value of 0.5.

The film properties quoted in the Tables were measured on films obtained by applying the indicated epoxide/hardener mixture to glass plates in layer thicknesses of from about 0.2 to 0.5 mm, followed by drying for 24 hours at room temperature (approximately 23° C.). In each case, the epoxide resin and hardener were used in an equivalent ratio.

The films were assessed according to the following criteria: freedom from tack, gloss, hardness (scratch resistance), surface faults (=blooming effect, wave-like faults, orange-peel effect) and transparency.

The main requirement for the suitability of an epoxide resin at room temperature is, of course, the freedom from tack of the film (surface), which was determined as follows:

The substrate was placed with the lacquer layer on top on a tared balance loaded with a counterweight of 1 kg. A small, fat-free plug of cotton wood 2 to 3 cm in diameter is placed on the lacquer layer and a small metal disc 2 cm in diameter is in turn placed on the cottonwool plug. Finger pressure is then applied to the disc until the balance is in equilibrium, after which the balance is held in equilibrium for 10 seconds. After the metal disc has been removed, an attempt is made to remove the cottonwool plug by gentle blowing. The lacquer layer is considered to be tack-free if the cottonwool plug no longer adheres to the lacquer layer and also does not leave any fibres behind.

The scratch resistance of a surface is expressed by its pencil hardness in accordance with the following scale:

| Scratch-resistant | Pencil hardness | >HB |
|---|---|---|
| Not quite scratch-resistant* | " | HB — B |
| Soft | " | 2B — 3B |
| Very soft | " | >3B |

*or almost scratch-resistant.

EXAMPLE 1

(a) After boiling with stirring for 10 hours in a nitrogen atmosphere at a sump temperature of 215° to 221° C., a mixture of 1392 g (6 moles) of pentaethylene hexamine (molecular weight 232) and 678 g (6 moles) of ε-caprolactam (molecular weight 113) is freed in vacuo from unreacted starting materials. A fraction (184 g) consisting essentially of ε-caprolactam is obtained at 123°–170° C./1.2–0.7 Torr whilst a fraction (430 g) consisting mainly of pentaethylene hexamine is obtained at 182°–202° C./0.6 Torr. Both fractions may be re-used as a starting material for a following batch.

The distillation residue, i.e. the reaction product of ε-caprolactam and pentaethylene hexamine (1355 g), is a yellowish oil. It has a flow-out viscosity of 2'30" (=2 minutes 30 seconds) in a 6 mm DIN cup and an NH-equivalent of 44. Films obtained from the above polyamide amine and epoxide resins I and II, after hardening for 24 hours at room temperature, have the properties shown in Table 1 under 1a (comparison).

(b) The reaction product of ε-caprolactam and pentaethylene hexamine (according to Example 1a) (1355 g) is reacted for 2 hours with stirring at 50° to 60° C. with 412 g (7.8 moles) of acrylonitrile. 1756 g of a cyanoethylated polyamide amine according to the invention are obtained in the form of a thick yellowish oil having a flow-out viscosity of 4'20" and an NH equivalent of 84. Films obtained from this cyanoethylated polyamide amine and epoxide resins I and II, after hardening for 24 hours at room temperature, have the properties shown in Table 1 under 1b (invention).

(c) For comparison with the hardener 1b according to the invention, pentaethylene hexamine (NH-equivalent 29, flow-out viscosity in a 6 mm DIN cup 13 seconds) and epoxide resins I or II are mixed in an equivalent ratio and the resulting mixture is cast onto glass plates to form films. After hardening for 24 hours at room temperature, the film properties shown in Table 1 under 1c were obtained.

(d) For further comparison, 232 g (1 mole) of pentaethylene hexamine were reacted with stirring for 1 hour at 50° C. with 106 g (2 moles) of acrylonitrile. A yellowish oil having a flow-out viscosity of 1 minute and an NH-equivalent of 56 is obtained. Films obtained from this amine and epoxide resins I and II, after hardening for 24 hours at room temperature, have the properties shown in Table 1 under 1d (comparison).

(e) For further comparison, a cyanoethylated polyamide amine of soya oil fatty acid, diethylene triamine and acrylonitrile corresponding to Example 1 of U.S. Pat. No. 3,091,595 (NH-equivalent 200; its flow-out viscosity could not be measured in a 6 mm DIN cup) was mixed with epoxide resin I in an equivalent ratio. Films were cast onto glass plates and their properties were determined after hardening at room temperature for 24 hours. See Table 1 under 1e (comparison).

(f) Cyanoethylated polyamide amine was prepared in accordance with Example 1 of U.S. Pat. No. 3,091,595, the diethylene triamine being replaced by pentaethylene hexamine. The NH-equivalent was 127; the flow-out viscosity could not be measured in a 6 mm DIN cup. Films obtained from this cyanoethylated amide amine and epoxide resin I, after hardening for 24 hours at room temperature, have the properties shown in Table 1 under 1f (comparison).

EXAMPLE 2

(a) A mixture of 4176 g (18 moles) of pentaethylene hexamine and 2034 g (18 moles) of caprolactam is boiled with stirring for 10 hours in a nitrogen atmosphere. The sump temperature is between 214° and 220° C. Thereafter, a conversion of from 80 to 83%, based on the polamine used, is reached. In all the following Examples, too, the conversion is based on the polyamine used.

(b) 372 g (6.9 moles) of acrylonitrile are added over a period of 1 hour with stirring at 50° to 60° C. to 1190 g of this reaction product, followed by stirring for another 30 minutes at 50° to 60° C. The amine according to the invention, a yellow oil, has an NH equivalent of 72 and a flow-out viscosity in a 6-mm DIN cup of 2'3". Films obtained from this amine and epoxide resins I and II, after hardening for 24 hours at room temperature, have the properties shown in Table 1 under 2b (invention).

(c) 345 g of the product obtained in accordance with Example 2a are reacted at 50° C. with 97 g (1.6 moles) of propylene oxide and then at 50° to 60° C. with 53 g (1 mole) of acrylonitrile. Dilution with 20% of benzyl alcohol (based on product 2a+propylene oxide+acrylonitrile) gives an oil having a flow-out viscosity in a 6 mm DIN cup of 5'6" and an NH equivalent of 108. Films obtained from this amine in benzyl alcohol and epoxide resins I and II, after hardening for 23 hours at room temperature, have the properties shown in Table 1 under 2c (invention).

(d) The procedure is as in Example 2c, except that the reaction with acrylonitrile is omitted. The flow-out viscosity in a 6 mm DIN cup is 5'30"; the NH-equivalent is 92. Films obtained from this amine in benzyl alcohol and epoxide resins I and II, after hardening for 24 hours at room temperature, have the properties shown in Table 1 under 2d (comparison).

EXAMPLE 3

A mixture of 1296 g (5.55 moles) of pentaethylene hexamine, 626 g (5.55 moles) of caprolactam and 5.8 g of p-toluene sulphonic acid is heated with stirring for 5 hours at 190° C. in a nitrogen atmosphere. Thereafter, the conversion amounts to 92%.

600 g (11.3 moles) of acrylonitrile are then added over a period of 2 hours with stirring at 50° to 60° C. to the pale yellow oil obtained, after which the mixture is kept under these reaction conditions for another 30 minutes. The flow-out viscosity (6 mm DIN cup) amounts to 2'3" and the NH equivalent to 74. Films obtained from this amine and epoxide resins I and II, after hardening for 24 hours at room temperature, have the properties shown in Table 1 under 3 (invention).

EXAMPLE 4

1355 g of the polyamide amine obtained in accordance with Example 1a are reacted with 312 g (5.9 moles) of acrylonitrile under the conditions of Example 1b. A yellowish oil having an NH equivalent of 71 and a flow-out viscosity (6 mm DIN cup) of 3' is obtained. Films obtained from this amine and epoxide resins I and II, after hardening for 24 hours at room temperature, have the properties shown in Table 1 under 4 (invention).

EXAMPLE 5

A mixture of 696 g (3 moles) of pentaethylene hexamine and 339 g (3 moles) of caprolactam is boiled under reflux for 12 hours, the sump temperature amounting to 221°–235° C. Conversion: approximately 85–87%. 345 g (1 mole) of the polyamide amine obtained are reacted with 79.5 g (1.5 moles) of acrylonitrile in the same way as in Example 1b. A yellowish oil having a flow-out viscosity of 4'30" (6 mm DIN cup) and an NH equivalent of 66 is obtained. Films obtained from this amine and epoxide resins I and II, after hardening for 24 hours at room temperature, have the properties shown in Table 1 under 5 (invention).

EXAMPLE 6

(a) A mixture of 339 g (3 moles) of ε-caprolactam and 1738 g (7.5 moles) of pentaethylene hexamine is heated under reflux with stirring for 12 hours. Unreacted starting material is distilled off in vacuo at a temperature of up to 190° C./0.5 Torr. 902 g of a yellowish oil are obtained as residue. It has a basic N content of 22.1% (calculated for the monoadduct of caprolactam with pentaethylene hexamine 24.3%, for the bis-adduct 18.3%); in other words, approximately 70% of the reaction product consists of the mono-adduct and 30% of the bis-adduct.

(b) 380 g of the above reaction product (containing approximately 1 mole of penaethylene hexamine as adduct) are reacted at 50° C. with 117 g (2.7 moles) of acrylonitrile. A yellowish oil having a flow-out viscosity of 5'10" in a 6 mm DIN cup is obtained. It has an amine equivalent of 95. Films obtained from this amine according to the invention and epoxide resins I and II, after hardening for 24 hours at room temperature, have the properties shown in Table 1 under 6b (invention).

TABLE 1

| | Film properties after hardening for 24 hours at room temperature (film thickness 0.3 mm) | | |
|---|---|---|---|
| Example No. | Reactivity | | Hardness |
| | Epoxide Resin I | | |
| 1a (comparison) | 55 | cloudy, smeary, tacky | soft |
| 1b (invention) | 27 | glossy, tack-free, fault-free surface, clear | scratch-resistant |
| 1c (comparison) | 57 | cloudy, smeary, serious faults | scratch-resistant |
| 1d (comparison) | 33 | dull, tacky surface with serious faults, cloudy | soft |
| 1e (comparison) | 29 | lustreless, tacky, dull surface, opaque | very soft |
| 1f (comparison) | 32 | low-gloss, very tacky surface, clouded | very soft |
| 2b (invention) | 33 | glossy, tack-free fault-free surface, clear | scratch-resistant |
| 2c (invention) | 27 | glossy, tack-free surface with very few faults, clear | not quite scratch-resistant |
| 2d (comparison) | 33 | cloudy, very tacky surface with serious faults | soft |
| 3 (invention) | 35 | glossy, tack-free fault-free surface, clear | scratch-resistant |
| 4 (invention) | 28 | gloss, tack-free surface with very few faults, clear | scratch-resistant |
| 5 (invention) | 31 | glossy, tack-free surface with very few faults clear | scratch-resistant |
| 6 (invention) | 30 | glossy, tack-free fault-free surface, clear | scratch-resistant |
| | Epoxide Resin II | | |
| 1a (comparison) | 56 | cloudy, smeary, | |

TABLE 1-continued

| Example No. | Reactivity | Film properties after hardening for 24 hours at room temperature (film thickness 0.3 mm) | |
|---|---|---|---|
| | | | Hardness |
| 1b (invention) | 27 | tacky | soft |
| | | glossy, tack-free, fault-free surface, clear | not quite scratch-resistant |
| 1c (comparison) | 58 | cloudy, smeary, serious faults | not quite scratch-resistant |
| 1d (comparison) | 35 | lustreless, tacky surface with serious faults, cloudy | soft |
| 1e (comparison) | 30 | lustreless, tacky dull surface, cloudy | very soft |
| 1f (comparison) | | low-gloss, very tacky surface, cloudy | very soft |
| 2b (invention) | 32 | glossy, tack-free fault-free surface, clear | not quite scratch-resistant |
| 2c (invention) | 28 | glossy, tack-free surface with very few faults, clear | not quite scratch-resistant |
| 2d (comparison) | 33 | cloudy, very tacky surface with serious faults | soft |
| 3 (invention) | 37 | glossy, tack-free fault-free surface, clear | almost scratch-resistant |
| 4 (invention) | 28 | glossy, tack-free surface with few faults | almost scratch-resistant |
| 5 (invention) | 32 | glossy, tack-free surface with few faults, clear | not quite scratch-resistant |
| 6 (invention) | 30 | glossy, tack-free fault-free surface | not quite scratch-resistant |

Comparative evaluation of the properties set out in Table 1 shows that cyanoethylated polyamide amines according to the invention and polyepoxides, applied in thin layers and hardened for 24 hours, give glossy, clear films with tack free surfaces which have very few, if any, faults and which, in most cases, are already scratch-resistant. By contrast, films obtained from the corresponding, non-cyanoethylated polyamide amines (Example 1a) or from the polyamine used for producing the polyamide amine (Example 1c) or from the corresponding cyanoethylated polyamine (Example 1d) or from cyanoethylated polyamide amines according to U.S. Pat. No. 3,091,595 (Examples 1e to 1f) after hardening for 24 hours at room temperature, have tacky surfaces which are not scratch-resistant. In most cases, the comparison films have surfaces with pronounced faults and are clouded. These results are all the more surprising insofar as, in most cases, the comparison hardeners have higher reactivity.

Even when the hardeners according to the invention contain unreacted starting products (Examples 2b, 2c, 3 and 5), they give in admixture with polyepoxides glossy, tack-free, clear films with very few, if any, surface faults after hardening for 24 hours. Hardeners according to the invention in which the degree of cyanoethylation was varied are used in Examples 4 and 6.

EXAMPLE 7

A mixture of 232 g (1 mole) of pentaethylene hexamine, 113 g (1 mole) of caprolactam and 6 g (0.1 mole) of acetic acid are heated for 7 hours with stirring to 180° C. in a nitrogen atmosphere. Conversion: approximately 77%. 106 g (2 moles) of acrylonitrile are then added over a period of 1 hour at 50° to 60° C., after which the mixture is left to react under these conditions for about 30 minutes until the acrylonitrile has been substantially completely reacted. A yellowish oil having a flow-out viscosity of 3'56" in a 6 mm DIN cup and an NH equivalent of 78 is obtained. The film properties are shown in Table 2 under 7 (invention).

EXAMPLE 8

(a) A mixture of 232 g (1 mole) of pentaethylene hexamine, 203 g (1.8 moles) of caprolactam and 1.3 g of p-toluene sulphonic acid is stirred for 8 to 10 hours at 180° C. in a nitrogen atmosphere. A yellowish oil having a flow-out viscosity in a 6 mm DIN cup of 4'20" and an NH equivalent of 54 is obtained. The film properties are set out in Table 2 under 8a (comparison). Conversion: approximately 71%.

(b) 435 g of the product according to 8a are quantitatively reacted at 50° to 60° C. with 80 g (1.51 moles) of acrylonitrile. The yellowish oil obtained has an NH equivalent of 79 and a flow-out viscosity in a 6 mm DIN cup of 5'7". The film properties are shown in Table 2 under 8b (invention).

(c) The procedure is as in (b), except that 106 g (2 moles) of acrylonitrile are used. A yellowish oil having a flow-out viscosity of 5'50" in a 6 mm DIN cup and an NH equivalent of 90 is obtained. The film properties are set out in Table 2 under 8c (invention).

EXAMPLE 9

A mixture of 189 g (1 mole) of tetraethylene pentamine, 113 g (1 mole) of caprolactam and 1 g of p-toluene sulphonic acid is stirred under nitrogen for 6 hours at 180° to 190° C., after which a conversion of approximately 72% is reached. The product is then quantatively reacted at 60° C. with 106 g (2 moles) of acrylonitrile. A yellowish oil having a flow-out viscosity of 2'50" in a 6 mm DIN cup and an NH equivalent of 81 is obtained. The film properties are shown in Table 2 under 9 (invention).

EXAMPLE 10

(a) A mixture of 189 g of tetraethylene pentamine (1 mole), 136 g (1.2 moles) of caprolactam and 1 g of p-toluene sulphonic acid is heated for 6 hours while stirring to 180°-190° C. in a nitrogen atmosphere. A yellowish oil having an NH equivalent of 47 is obtained. Conversion: approximately 80%. The film properties are shown in Table 2 under 10 A (comparison).

(b) 325 g of the product according to 10 (a) are quantitatively reacted at 60° C. with 85 g (1.6 moles) or acrylonitrile. The end product is a yellowish oil having a flow-out viscosity of 3'10" in a 6 mm DIN cup and an NH equivalent of 86. The film properties are shown in Table 2 under 10b (invention).

EXAMPLE 11

A mixture of 146 g (1 mole) of triethylene tetramine 113 g (1 mole) of caprolactam and 0.2 g of phosphorous acid is heated with stirring for 6 hours to 190° C. in a nitrogen atmosphere (conversion approximately 68%) and, after cooling to 80° C., quantitatively reacted with 106 g (2 moles) of acrylonitrile. The yellowish oil thus obtained has an NH equivalent of 91 and a flow-out viscosity of 2′10″ in a 6 mm DIN cup.

The film properties are shown in Table 2 under 11 (invention).

EXAMPLE 12

(a) A mixture of 58 g (0.25 mole) of pentaethylene hexamine, 47 g (0.25 mole) of tetraethylene pentamine, 37 g (0.25 mole) of triethylene tetramine, 26 g (0.25 mole) or diethylene triamine, 124 g (1.1 moles) of caprolactam and 0.9 g of p-toluene sulphonic acid is heated for 6 to 7 hours with stirring to 180°–190° C. in a nitrogen atmosphere. A yellowish oil having an NH equivalent of 45 is obtained. Conversion: approximately 85%. The film properties are shown in Table 2 under 12 a (comparison).

(b) 293 g of the reaction mixture according to (a) are quantitatively reacted at 60° to 70° C. with 106 g (2 moles) of acrylonitrile. The oily yellowish reaction product has a flow-out viscosity of 2′20″ in a 6 mm DIN cup and an NH equivalent of 88.

The film properties are shown in Table 2 under 12 b (invention).

TABLE 2

| Example No. | Reactivity | Film properties after hardening for 24 hours at room temperature (film thickness 0.3 mm) | Hardness |
|---|---|---|---|
| | | Epoxide Resin I | |
| 7 (invention) | 34 | Glossy, tack-free surface with very few faults, clear | scratch-resistant |
| 8a (comparison) | 54 | cloudy, very tacky surface with serious faults | soft |
| 8b (invention) | 35 | glossy, tack-free fault-free surface, clear | scratch-resistant |
| 8c (invention) | 33 | glossy, tack-free surface with very few faults, clear | scratch-resistant |
| 9 (invention) | 36 | glossy, tack-free surface with few faults, clear | scratch-resistant |
| 10a (comparison) | 31 | lustreless, tacky surface with serious faults, cloudy | soft |
| 10b (invention) | 27 | glossy, tack-free fault-free surface, clear | scratch-resistant |
| 11 (invention) | 31 | glossy, tack-free fault-free surface clear | scratch-resistant |
| 12a (comparison) | 48 | lutreless, tacky surface with serious faults | soft |
| 12b (invention) | 32 | glossy, tack-free fault-free surface clear | scratch-resistant |
| 7 (invention) | 34 | glossy, tack-free surface with very few faults, clear | not quite scratch-resistant |
| 8b (invention) | 35 | glossy, tack-free fault-free surface clear | almost scratch-resistant |
| 8c (invention) | 33 | glossy, tack-free surface with few faults | almost scratch-resistant |
| 9 (invention) | 32 | glossy, tack-free surface with few faults, clear | not quite scratch-resistant |
| 10b (invention) | 27 | glossy, tack-free fault-free surface clear | not quite scratch-resistant |
| 12b (invention) | 32 | glossy, tack-free fault-free surface clear | not quite scratch-resistant |

We claim:

1. A compositions suitable as a hardener for polyepoxides containing more than one 1,2-epoxide group per molecule comprising a cyanoethylated polyamide amine containing free secondary or primary or secondary and primary amino groups, said cyanoethylated poly-amide amine being the reaction product of polyadded units of (A) 1 mole of a polyamine corresponding to the formula:

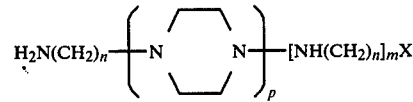

in which p=0, n=2 or 3, m=0 to 6 and X=NH$_2$, or p=1, n=2 or 3, m=0 and X=H, (B) from 0.5 to 2.3 moles of a saturated lactam, and (C) from 0.4 to 2.8 moles of acrylonitrile, methacrylonitrile or mixtures thereof.

2. The composition as claimed in claim 1, which has been additionally modified with from 0.01 to 1.8 moles of a 1,2-alkylene oxide containing from 2 to 4 carbon atoms or with from 0.001 to 0.3 moles of a carboxylic acid or with the 1,2-alkylene oxide and the carboxylic acid in the quantities indicated, based in each case on 1 mole of the polyamine.

3. The composition as claimed in claim 1 wherein said saturated lactam is of the formula

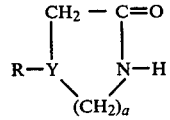

wherein Y is a CH group, R is hydrogen and a is an integer of from 0 to 9 or Y is nitrogen, R is a saturated aliphatic radical, an araliphatic radical containing 7 to 12 carbon atoms, pyridine or pyridine substituted by at least one alkyl radical having from 1 to 4 carbon atoms and a is 3.

* * * * *